UNITED STATES PATENT OFFICE.

FRANK G. PERKINS, DECEASED, LATE OF SOUTH BEND, INDIANA, BY GERTRUDE S. PERKINS, OF SOUTH BEND, INDIANA, EXECUTRIX, AND PERKINS GLUE COMPANY, A CORPORATION OF PENNSYLVANIA, ASSIGNEE.

GLUE AND METHOD OF MAKING THE SAME.

13,436. Specification of Reissued Letters Patent. Reissued July 2, 1912.

No Drawing. Original No. 1,020,655, dated March 19, 1912, Serial No. 460,737. Application for reissue filed May 17, 1912. Serial No. 698,052.

*To all whom it may concern:*

Be it known that I, FRANK G. PERKINS, a citizen of the United States, and a resident of South Bend, county of St. Joseph, and State of Indiana, have invented certain new and useful Improvements in Glue and Methods of Making the Same, of which the following is a specification.

My invention relates to improvements in glue and the method of making the same, and more particularly to the manufacture of glue from carbohydrates containing amylo-cellulose or its equivalent.

In the well known method of making a "starch paste" the solid is mixed with water enough, to make, after tumefying, a paste of such viscosity or density that it can be easily applied. This mixture is then subjected to heat to rupture or burst the cellulose walls and this cooking to a considerable degree supposedly reduces the cellulose to soluble starch, particularly in the presence of soluble starch already in solution. To increase the body or viscosity small amounts of ammonia have been added prior to or after heating. Such pastes have not the necessary relative "tack," viscocity, cohesiveness and tenacity to spread and adhere properly when applied as wood glues. Such pastes in cooling also become extremely thick and jelly-like and are practically unsatisfactory for woodwork when originally made with water, or diluted after cooking, because water warps the wood and delays drying and the pastes do not set hard enough and are not dense and elastic enough when dry. If more water is added in an attempt to make it more fluid, the paste becomes so weak and diluted that it has practically no power and would be wholly unfit for most classes of work, especially wood joints.

Various objects of my invention are to provide a glue and a method of making the same from carbohydrates, which will not have the disadvantages just pointed out, but which will be exceptionally tenacious and powerful but still amply fluid for easy application, and which can be economically and easily produced.

A further object of my invention is to produce a glue which will have the great practical advantage that it may be practically used for the same purposes as the best animal glue, and possess certain great advantages of permanency to weather and temperature variations far superior to those of animal glue. As far as I am aware, such conditions have never been met by any prior adhesive made from a carbohydrate base.

A further important object of my invention is to produce an adhesive or glue base which may be stored or sold in a dry state and which may then be prepared for use by mixing up with or without the use of heat. Such improvements are of great practical and industrial advantage and importance and have been much sought. To do this I first take a carbohydrate of the proper kind, and treat it with a reagent to decrease its water absorptive properties in the sense that to render fluid the finished glue, comparatively little water will have to be added and the final glue will not thereby become seriously diluted. The reagent I use I call a starch converting agent because it is believed it exercises, at least in part, a hydrolyzing or oxidizing or converting action similar to that of the well known starch converting agents many of which have been used to convert starch into soluble starch and dextrin. I may use any suitable starch converting agent but the action I produce is preferably much less complete since it is not my object to convert the starch wholly but only to effect its physical properties when put into solution or dissolved to form glue. The effect of this treatment is also that it decreases the viscosity of the glue produced with a given amount of water without detriment to its "tack," quick adhesive properties and cohesion. As a base I prefer to use the starch secreted by the cassava plant, which has peculiar properties and advantages for this purpose. After being treated as above, the dried material may be mixed with a small amount of water and with a solvent of amylo-cellulose, such as caustic alkali, and a glue produced the strength of which when dry is superior to the lateral strength of wood fiber. The prepared glue is very stable in its physical condition, so much so, that it may be kept for days or even weeks after it has been mixed for application without fermentative change. By my process in its preferred form the glue is free from the complications which attend the use of an adhesive which must be cooked or warmed before use, or kept warm during use, and is more powerful than that which results from the treatment of starch in other ways. My improved glue when made in its best form and properly applied will not only tear away the wood at some point in the wood joint produced by the use of this glue, but will tear away the wood at many points whether with or against the grain.

Further objects, advantages and features will more clearly appear from the detailed description given below.

In carrying out one embodiment of my invention I take the cassava carbohydrate or flour in dry form and add at least an equal weight of water. The batch is then agitated and heated to about 130° F., which is below the bursting temperature of the starch. Then I slowly add from 2% to 3% by weight (of the raw carbohydrate) of strong sulfuric acid. This may be considerably diluted if desired before it is added. The same is kept in continual agitation. The agitation preferably produced by thorough stirring is continued for from four to six hours after the acid has been added and then the acid may be neutralized by the addition of a small amount of caustic soda or similar alkali. The acid acts upon the starch or carbohydrate to decrease its water absorptive properties. As the acid appears to remain unchanged in the batch, until neutralized, I believe it acts catalytically to change the molecular condition of the carbohydrate without rendering it substantially soluble in the water. However, great care must be exercised not to have the heat sufficient or the acid in such quantity as to put the starch or carbohydrate in solution. If the action of the acid and heat is carried too far the starch will be changed into dextrin, and will go into solution, and as such it would be lost to my process, as I utilize only the suspended material. Even this would cease to have the desired properties if the action were carried too far.

That a large part, if not all, of the starch does not, in my improved process, go into solution, is shown by its settling upon stopping the agitation and by the weight and analysis of the product yielded. The batch therefore has not been converted into dextrin. Sulfuric and other acids as well as other starch converting agents are stated to have a catalytic action affecting the molecular state of amylose or its state of hydration. This I believe to be promoted and equalized by prolonged agitation both together with the action of heat, removing constituents or destroying states of aggregation or polymerization, which are detrimental to the use of the carbohydrate as a glue base. The amount of alkali used is only enough to neutralize the acid. After this has been added, the batch is then cooled, drained and dried and kept in dry form until ready for use.

I find that the carbohydrate secreted by the cassava plant and known as cassava flour has many advantages over other starches and starchy products and prefer its use, but such other starches or starchy products may be used with more or less success. Other starchy products from the cassava plant are found to be more or less adaptable and even other starchy products may be used with some little success but they do not produce glues so tenacious and are otherwise more or less undesirable. Some are affected by impurities.

The above forms the first part of my improved process and the various steps therein may all be carried out at the factory.

In commercial use I preferably ship the dry material, obtained as above, to the consumer who carries out the second part of the process at the place where the glue is to be used, but if desired the first and second parts of my improved process may be carried out together.

In carrying out the remaining steps in the preparation of my improved glue, the dried base, obtained as above, is mixed with about three parts or less by weight (of dried base) of water according to the strength of the joint and economy desired. The dried base does not materially go into solution in the water unless heat is applied, but a liquid suspension is thereby formed which is agitated and treated with a solvent of cellulose, as, for example, an aqueous solution of caustic soda or potash alkaline to phenolphthalein, using if cold from six to ten per cent. of the weight of the dry base, of caustic soda or its equivalent of caustic potash. The alkali, I believe, acts chemically to unite with one or more starch molecules and with the water to form a colloidal compound. The alkali is best added in the form of a solution of from 33% to 50% strength. Sodium and potassium hydrates are the most available and among the most powerful of the known solvents of the starch cellulose and are well adapted for most purposes.

To take a specific example, a given quantity, say 100 lbs. of the dried amylaceous base was mixed with from 100 to 300 lbs. of water (preferably 225 lbs. or less). After the mixture was thoroughly agitated, 10 lbs. of caustic soda was added in a concentrated solution of approximately one part alkali in one to two parts water. This was added with extreme slowness, requiring 15 to 20 minutes for the 30 lbs. solution required. During this time constant stirring was maintained in order to equalize and distribute the action of the caustic soda as fully as possible. When normal temperatures were used the result has not been obtained with less than 6 parts of NaOH per 100 parts of amylaceous base. The result consists in what is called the passing over or "coming across" of the mixture and may be described as follows: During the earlier stages of the addition of the caustic in the above example, little difference in the appearance of the mass was apparent. Soon, however, it became creamy and then more pasty and difficult to stir. When about half the caustic soda har been added, there was faintly observable a minute mottled effect on the surface of the mass being stirred, and it gradually assumed a translucent porcelain-like appearance. If at this time a little of the mixture was squeezed between glass plates portions of the mixture were observed to be transparent and almost invisible. Other portions presented much the appearance of the original mixture of water and suspended particles of starch. As the addition of caustic soda proceeded accumulations of clearer matter occurred on the sides of the vessel and on parts of the stirrers and finally when the proper amount of caustic had been added, the entire mass "passed over" or "came across", being converted from a mixture of suspended starch and water containing caustic to a homogeneous colloidal compound of starch, caustic and water. A little excess of caustic was preferably added to prevent decomposition of the compounds by the carbonic acid or moisture of the air. As much as fourteen per cent. NaOH, or the equivalent of other caustic may be used, leaving some free caustic in the prepared glue. The word "compound" is here used in the more modern chemical sense of matter connected within the limits of some quantitative relation to produce a definitely recognizable product having certain definite physical characteristics. It is found that temperature affects the amount of caustic required to produce this result and it is believed that as temperature affects the polymerizing or uniting power of the starch molecules, one with another, so it affects the ability of a smaller quantity of caustic to satisfy or bring across a given quantity of starch. It is found that at successively increasing temperatures one is enabled to bring across the mixture with successively decreasing proportions of caustic.

As previously stated, when ordinary starch is heated with water, it absorbs enormous quantities of water, and if only two or three parts of water are used becomes of a stiff jelly-like form which must be very much diluted before it will be practically workable. I find, however, that using my improved glue base and method of mixing the same, this water absorbing power can be greatly reduced and can be regulated, although the mixing is done with the same proportions of alkali and carbohydrate or else the same temperature, which have hitherto produced unworkable jellies or weakly adhesive pastes or mucilages. And by the use of cassava starch in particular, results can be secured entirely different from those hitherto produced, as stated by others, preferably with corn. Thus, by proper adjustment of conditions of mixing I am able to produce this glue even with certain grades of untreated cassava carbohydrate and with other starches and conversion products (starchy carbohydrates). The preliminary treatment, however, substantially reduces the absorption of water by the starch and prevents it from becoming jelly-like and tough when afterward treated either with the water as above indicated or with the alkali, or both.

In the second part of my improved process, less than about three parts of water by weight to one part of the dry material are used and after adding the solvent it is found that even with such a small amount of water, the batch will assume a semi-fluid consistency much superior to that ordinarily obtained by the use of water alone and will not become jelly-like and tough as in former processes. The alkali added acts, I believe, to dissolve more or less of the cellulose and carbohydrate, uniting with the same and with the water and forming a glue of very tenacious properties. The dry carbohydrate is mixed with the water with a carefully regulated heat, if any. The action of heat replaces the action of a portion of the caustic in transforming the glue base, as explained above. By the preliminary treatment in reducing the water absorbing power of the carbohydrate, a very concentrated mixture with water may be obtained.

Experiments indicate that after the carbohydrate base has been treated in accordance with the first step of my process, the proportion of amylo-cellulose in the carbohydrate granule has been increased. I believe this increase in the percentage or proportion of the amylo-cellulose in the carbohydrate allows of the same to be changed into a good glue with very much less water than would otherwise be required. One way which has been found quite satisfactory for determining when the action of the acid or its equivalent, and the agitation, have been carried far enough in the first step, is as follows:

When the carbohydrate glue base which has been dried has been boiled for ten minutes with dry live steam at 100 lbs. pressure with 9 parts of water and tested for viscosity while hot, it showed a viscosity between that of cold water and three times that of cold water.

In specific examples tried, the carbohydrate base, subjected to the above test, has shown viscosities between that of cold water and three times that of cold water, but a product showing about two times the viscosity of water is preferred. In measuring this viscosity 350 grams of base were mixed with 3150 c. c. of cold water and 450 grams of the steam condensed therein and tested at 195° F. A Perkins viscosimeter was used, which may be constructed of brass tubing 1.295 inches outside diameter, 0.012 inch thick, and 3 inches long, and having a flat brass bottom 0.080 inch thick soldered into the end having a round center hole 0.070 inch in diameter, the total weight being 39.63 grams, and all edges being made smooth removing practically no weight, the hole being polished until the cup placed quickly at its floating level in water at 60° F. floats upright and fills up to the point of sudden sinking by top overflow in 16 seconds. If the material directly from the treatment tank of the first step is to be tested, a small quantity is taken, neutralized and diluted with cold water to 4¼ Be'. 3150 c. c. of this thoroughly mixed batch are then taken in a vessel and the steam similarly admitted to the bottom of the batch, but this is found to indicate about 6½ seconds lower.

The carbohydrate glue base in the preferred form retains substantially unchanged the size and general form of particle as viewed under the microscope when treated with cold water, and produces opalescent cloudy solutions with water at 200° F.

When treated in accordance with my process, I find that the carbohydrate glue base may be formed into glue by using only from one to three parts of water, the more water used the greater the delay in drying. Preferably less than 4½ parts of water should be used in making the glue from the carbohydrate base.

I believe that the cause of the tenacious properties when carbohydrates are treated with water and a strong solution of an alkali may be traced to the proper proportioning of viscosity, cohesion and adhesion, together with the peculiar chemical action which caustic loosely combined or free in the glue as applied, exerts on the cellulose which it in turn combines with, in making the joint to form alkali metal carbonate, bicarbonate and acetate. I believe this proper proportioning is due to the partial change of the integument and the proper proportioning of the amylo-cellulose and the granulose (or the proper mean polymerization) when united with the caustic and water. Consequently, I believe that to obtain the best results it is necessary to abstain from reducing the cellulose to true soluble starch, and that sufficient cellulose must be left to make the glue amply tenacious. Therefore, the action of the acid and alkali should not be carried so far nor the temperature be so high as to destroy all the cellulose and impair its strength by changing it into soluble starch and the starch into sugar or dextrin. Also, in actual practice I have found that a good glue is produced by treating the base with the chemicals to reduce the water absorbing power to a point where the base if mixed with from 2 to 3 parts of water and subjected to heat of 170° F. would result in a syrupy condition instead of a thick jelly-like mass. I find that by such suitable treatment under my process it is possible to produce from the base long filaments having a strength similar to threads of animal glue. Practically all the water must be later removed that goes into the glue solution and is applied to the joints, hence an increase of water in the glue solution involves changes in drying methods, or in drying time, or in risks of injury to the material due to warping by the extra water, all of very serious consequence. The diluted or adulterated pastes hitherto made from the natural carbohydrates in the manner explained before are unfit for many classes of work and especially wood joint work, since they contain so much water or adulterants that it takes the joints very long to dry or when they do become dry there is so little binding material left that only a very weak bond is obtained. Thus it is of the greatest importance and value to produce a concentrated glue solution ready for application, which parallels the animal glue solutions now employed industrially, in respect to water contents and physical properties in application, and is equal or superior as to strength and permanency.

Certain advantages of my improved process may be obtained to some extent even although other materials be mixed with the amylaceous material to form the glue base.

In the preferred form described my improved glue is transparent and free from odor, and is very stable after mixing for use, it is instantly adhesive to clean surfaces, its cohesion is very great but not sufficient to overcome its adhesion and its viscosity is lasting and low enough to permit ready application, but so proportioned to its cohesion that it is capable of being applied by machinery like hide glue, but still very long tough fibers are produced if freshly joined surfaces are separated. I have found that, owing to the breakage of these filaments quick separation of such surfaces produces a crackle like electric sparks.

My glue will produce joints which are practically unaffected by natural humidity and which are unaffected by prolonged dry heat. In the preferred form it forms a joint with wood or other cellulosic material, which joint is distinguished from ordinary mucilages, sizes and pastes by the fact that it consists of the following layers in the order named, unaltered cellulosic material, cellulosic material altered by caustic, tough amylaceous material altered by caustic, cellulosic material altered by caustic and unaltered cellulose. This joint can probably be distinguished wherever found, by the shading of the above layers into one another when stained with iodin and examined under the microscope and by other tests. Glued up panels have been placed behind a radiator for 18 months without cracking or separating of the glue joint. These features make my glue especially advantageous for purposes in which other vegetable glues are practically useless.

Although I have described my improvements in great detail and with much particularity and have mentioned particular compounds which I prefer to use, I desire it to be understood that I do not limit myself to such details and compounds, except as clearly specified in the appended claims, as many modifications and substitutes may be found, but, Having fully and clearly described my invention with respect to one particular embodiment thereof, what I claim and desire to secure by Letters Patent, is:

1. The process of making a glue base which consists in agitating cassava carbohydrate with water and a starch converting agent whereby the polymerization of the carbohydrate is altered to a point such that when dissolved it will form a viscous semi-fluid unjellified product adapted to be applied by machinery.

2. The process of making wood glue which consists in taking suitable carbohydrate material and properly proportioning the viscosity, cohesiveness and adhesiveness of the carbohydrate material resulting when it is dissolved to form glue applicable by machinery and then dissolving the carbohydrate material with a solvent of cellulose to put it into solution to form glue.

3. The process of making a glue base which consists in agitating a starchy carbohydrate with water and a starch converting agent to decrease the water absorptive properties of the carbohydrate to properly proportion the viscosity, adhesiveness and cohesiveness resulting when the base is dissolved to form glue properly for the application of the glue by machinery.

4. The process of making a glue base which consists in agitating a starchy carbohydrate with water and suitable chemicals below the bursting temperature of the starch to proportion the viscosity, adhesiveness and cohesiveness resulting when the base is dissolved to form glue applicable by machinery.

5. In the making of adhesives, treating cassava flour with substantially an equal weight of water, heating the same to about 130° F. and adding about 2% or 3% by weight of strong acid slowly and with agitation, without rendering the flour materially soluble in water, then neutralizing the acid with an alkali after from 4 to 6 hours agitation.

6. In the making of a glue base, treating amylaceous material with a reagent to decrease its water absorptive properties, leaving a material portion of amylaceous material in the product insoluble in water.

7. In the making of adhesives, treating a suitable carbohydrate with water and a digesting agent without rendering the carbohydrate materially soluble in water, to decrease the water absorptive properties of the carbohydrate.

8. A glue base characterized by the facts that it is prepared from starchy material, retains substantially unchanged the size and general form of particle when treated with cold water, and produces opalescent cloudy solutions with water at 200° F.

9. The process of making glue which consists in treating starch below the bursting temperature of the starch, with a digesting agent such as caustic and water until the material assumes a viscous semi-fluid consistency adapted to be applied by machinery.

10. The process of making glue which consists in dissolving cassava carbohydrate in caustic alkali until a glue is formed as distinguished from mucilages, sizes and pastes.

11. The process of making a glue, which consists in treating a starchy carbohydrate with caustic alkali, and water, to dissolve the carbohydrate, the total amount of water used being about 3 parts or less by weight of the carbohydrate, the amount of caustic alkali used, calculated as NaOH being about 10% or less by weight of the carbohydrate so that a wood glue is formed, as distinguished from mucilages, sizes and paste.

12. The process of making a glue, which consists in mixing starch with water and caustic alkali to dissolve the carbohydrate, the amount of water used being about 3 parts or less by weight of dry carbohydrate so that a wood glue is formed, as distinguished from mucilages, sizes and paste.

13. The process of making a wood glue which consists in treating a suitable starchy product a material portion of which is substantially insoluble in water with a solvent of cellulose and about 3 parts or less by weight of water, to produce a glue having adhesive powers substantially as great as those of good animal glue.

14. In the making of glue, treating a suitable starchy product with about three parts or less by weight of water and adding a solution of caustic soda or other equivalent alkali using about 10% or less by weight of the caustic soda or its equivalent of other alkali to dissolve the product.

15. In the process of making wood glue, the combination of the following steps, agitating a starchy carbohydrate with a digesting agent to decrease its water absorptive properties without converting the batch into dextrin, and then substantially dissolving the product thus produced with about three parts or less of water until the resulting product has a consistency such that it is applicable to glue up veneers.

16. In the process of making wood glue, agitating a starchy carbohydrate with a digesting agent until a sample of the material taken from the batch and dissolved will show a viscosity, adhesiveness and cohesiveness substantially equal to animal glue.

17. The process of making wood glue which consists in agitating starch with a digesting agent to decrease its water absorptive properties without rendering the carbohydrate materially soluble in cold water and then combining the product thus produced with a solvent of cellulose to produce a glue for application, thus proportioning the viscosity, adhesiveness and cohesiveness of the final glue.

18. The process of making wood glue which consists in agitating a starchy carbohydrate with a digesting agent to decrease its water absorptive properties and then combining the product thus produced with alkali and water to produce a glue for application having free caustic alkali therein.

19. In the process of making wood glue, the combination of the following steps, agitating a cassava carbohydrate with a digesting agent to decrease its water absorptive properties without rendering the carbohydrate materially soluble in cold water and then putting the product thus produced into a solution containing about three parts or less by weight of water to produce a glue for application.

20. The process of making glue, which consists in agitating a starchy carbohydrate with water and a digesting agent to reduce the water absorptive properties of the carbohydrate without rendering it materially soluble in water, then mixing the carbohydrate with water and caustic alkali, the amount of water used being about three parts or less by weight of dry carbohydrate, the amount of caustic used being about 10% or less by weight of dry carbohydrate, to dissolve the carbohydrate to form the glue as distinguished from mucilages, sizes and paste.

21. The improved glue process which consists in treating cassava carbohydrate with substantially an equal weight of water, heating the same to about 130° F., adding from 2% to 3% by weight of an acid, slowly, and during agitation, neutralizing the batch with an alkali after from 4 to 6 hours agitation, then cooling and drying the batch, then adding from 1 to 3 parts by weight of water, and then while being agitated treating the same with a solution of a caustic alkali using about 10% or less by weight of the dry alkali and applying the resulting product to surfaces with which the caustic is adapted to combine and forming a joint between said surfaces.

22. In the making of adhesives, treating a suitable starchy carbohydrate insoluble in water with water with a reagent to decrease its water absorptive properties but without rendering the carbohydrate materially soluble in water, then allowing the batch to dry, then treating the same with water and a solvent of cellulose such as caustic alkali to form glue.

23. In the making of adhesives, treating a suitable starchy carbohydrate with an agent having an acid reaction without rendering the carbohydrate materially soluble in water, to decrease the water absorptive properties of the carbohydrate and then treating the carbohydrate with a solvent of cellulose, thus proportioning the viscosity, adhesiveness and cohesiveness of the final glue.

24. A carbohydrate base for making glue composed of suitable carbohydrate which when mixed with about 3 parts or less by weight of water and a solvent of cellulose will form a semi-fluid mass having substantially the adhesive properties of animal glue.

25. A base for making glue as distinguished from mucilages, sizes and pastes, embracing treated amylaceous grains substantially insoluble in water and the outer so-called amylo-cellulose coating of which insoluble grains has been partially but not entirely converted.

26. A base for making glue composed of a starchy carbohydrate or its equivalent which when boiled for 10 minutes with dry hot steam at 100 pounds pressure with nine parts of water and tested for viscosity while hot will show a viscosity between that of cold water and three times that of cold water.

27. A base for glue as distinguished from mucilages, pastes and sizes, comprising treated cassava amylaceous grains in which the proportion of so-called cellulose is greater than in the natural material from which the base is derived.

28. A glue comprising cassava carbohydrate rendered semi-fluid by digestion and having substantially the properties of animal glue.

29. A glue comprising chiefly starch dissolved by a digesting agent alkaline to phenolphthalein and in about 3 parts or less by weight of water.

30. A wood and fiber glue formed of a starchy carbohydrate or its equivalent by union therewith of about 3 parts or less by weight of water and alkali metal hydroxid.

31. A wood and fiber glue containing amylaceous material as a base dissolved without acid in about three parts of water or less, and being viscous, semi-fluid and unjellified.

32. A glue as distinguished from mucilages, sizes and pastes containing a starchy carbohydrate base substantially insoluble in water and dissolved by caustic and containing free caustic.

33. A glue consisting of a vegetable carbohydrate base substantially insoluble in water and dissolved by water and caustic soda alkali, the amount of water being about three parts or less by weight of dry carbohydrate and the amount of caustic present being about 10% or less by weight of the dry carbohydrate.

34. A glue consisting of a vegetable carbohydrate base substantially insoluble in water and dissolved by caustic alkali, the amount of water being about three parts or less by weight of dry carbohydrate.

35. A glue containing a starchy carbohydrate base dissolved by a solvent of cellulose and water, the amount of water in the glue being about three parts or less by weight of dry carbohydrate.

36. A glus as distinguished from mucilages, sizes and pastes, consisting chiefly of a starchy carbohydrate base substantially insoluble in water and dissolved by a solvent of cellulose.

37. A glue composed of a starchy carbohydrate base and a solvent of cellulose and having such a character that it will be substantially unaffected by the natural humidity and having substantially as good adhering qualities as the best animal glue.

38. The process of making a wood glue which consists in suspending a glue base containing amylaceous matter insoluble in water in about three parts or less by weight of water and treating the base with an alkali properly proportioned substantially as described to produce a glue having a lasting viscosity to flow through pipes and the adhesiveness of animal glue.

In testimony whereof, I have signed my name to this specification, in the presence of two subscribing witnesses.

FRANK G. PERKINS,
By GERTRUDE S. PERKINS,
*Executrix of the last will and testament of Frank G. Perkins.*

Witnesses:
S. D. TAYLOR,
L. MCMILLEN.

GERTRUDE S. PERKINS,
*Executrix of the last will and testament of Frank G. Perkins.*

Witnesses:
S. D. TAYLOR,
L. MCMILLEN.

[L. S.] PERKINS GLUE COMPANY,
*Assignee,*
By JULIUS B. B. STRYKER,
*Vice President.*

Witnesses:
ABRAHAM A. DELP,
J. B. SMITH.

Disclaimer in Letters Patent Reissue No. 13,436.

DISCLAIMER.

13,436. (Reissue.)—*Frank G. Perkins*, deceased, late of South Bend, Ind.; Gertrude S. Perkins, executrix. GLUE AND METHOD OF MAKING THE SAME. Patent dated July 2, 1912. Disclaimer filed February 6, 1919, by the assignee, *Perkins Glue Company*.

"Enters its disclaimer of claims 1, 3, 4, 6, 7, 8, 16, 24, 25, 26, and 27 thereof (to wit; the claims for the glue base *per se* and for the process of making the glue base *per se*) and further it hereby disclaims from claims 9, 10, 11, 12, 13, 14, and 38 of said reissued Letters Patent, No. 13,436 any process of making glue, excepting where the starch or starchy product or carbohydrate subjected to the process is degenerated to the extent described in the said reissued Letters Patent No. 13,436, whereby the process results in the good as animal glue described in said reissued Letters Patent No. 13,436."

29. A glue comprising chiefly starch dissolved by a digesting agent alkaline to phenolphthalein and in about 3 parts or less by weight of water.

30. A wood and fiber glue formed of a starchy carbohydrate or its equivalent by union therewith of about 3 parts or less by weight of water and alkali metal hydroxid.

31. A wood and fiber glue containing amylaceous material as a base dissolved without acid in about three parts of water or less, and being viscous, semi-fluid and unjellified.

32. A glue as distinguished from mucilages, sizes and pastes containing a starchy carbohydrate base substantially insoluble in water and dissolved by caustic and containing free caustic.

33. A glue consisting of a vegetable carbohydrate base substantially insoluble in water and dissolved by water and caustic soda alkali, the amount of water being about three parts or less by weight of dry carbohydrate and the amount of caustic present being about 10% or less by weight of the dry carbohydrate.

34. A glue consisting of a vegetable carbohydrate base substantially insoluble in water and dissolved by caustic alkali, the amount of water being about three parts or less by weight of dry carbohydrate.

35. A glue containing a starchy carbohydrate base dissolved by a solvent of cellulose and water, the amount of water in the glue being about three parts or less by weight of dry carbohydrate.

36. A glus as distinguished from mucilages, sizes and pastes, consisting chiefly of a starchy carbohydrate base substantially insoluble in water and dissolved by a solvent of cellulose.

37. A glue composed of a starchy carbohydrate base and a solvent of cellulose and having such a character that it will be substantially unaffected by the natural humidity and having substantially as good adhering qualities as the best animal glue.

38. The process of making a wood glue which consists in suspending a glue base containing amylaceous matter insoluble in water in about three parts or less by weight of water and treating the base with an alkali properly proportioned substantially as described to produce a glue having a lasting viscosity to flow through pipes and the adhesiveness of animal glue.

In testimony whereof, I have signed my name to this specification, in the presence of two subscribing witnesses.

FRANK G. PERKINS,
By GERTRUDE S. PERKINS,
*Executrix of the last will and testament of Frank G. Perkins.*

Witnesses:
S. D. TAYLOR,
L. MCMILLEN.

GERTRUDE S. PERKINS,
*Executrix of the last will and testament of Frank G. Perkins.*

Witnesses:
S. D. TAYLOR,
L. MCMILLEN.

[L. S.] PERKINS GLUE COMPANY,
*Assignee,*
By JULIUS B. B. STRYKER,
*Vice President.*

Witnesses:
ABRAHAM A. DELP,
J. B. SMITH.

Disclaimer in Letters Patent Reissue No. 13,436.

DISCLAIMER.

13,436. (Reissue.)—*Frank G. Perkins*, deceased, late of South Bend, Ind.; Gertrude S. Perkins, executrix. GLUE AND METHOD OF MAKING THE SAME. Patent dated July 2, 1912. Disclaimer filed February 6, 1919, by the assignee, *Perkins Glue Company*.

"Enters its disclaimer of claims 1, 3, 4, 6, 7, 8, 16, 24, 25, 26, and 27 thereof (to wit; the claims for the glue base *per se* and for the process of making the glue base *per se*) and further it hereby disclaims from claims 9, 10, 11, 12, 13, 14, and 38 of said reissued Letters Patent, No. 13,436 any process of making glue, excepting where the starch or starchy product or carbohydrate subjected to the process is degenerated to the extent described in the said reissued Letters Patent No. 13,436, whereby the process results in the good as animal glue described in said reissued Letters Patent No. 13,436."